(12) United States Patent
Kim

(10) Patent No.: US 12,744,256 B2
(45) Date of Patent: Sep. 22, 2026

(54) MELT BONDING PREVENTION METHOD AND BATTERY SYSTEM APPLIED WITH THE SAME

(71) Applicant: LG ENERGY SOLUTION, LTD., Seoul (KR)

(72) Inventor: Kihoon Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 1121 days.

(21) Appl. No.: 17/789,992

(22) PCT Filed: Jun. 11, 2021

(86) PCT No.: PCT/KR2021/007310
§ 371 (c)(1),
(2) Date: Jun. 29, 2022

(87) PCT Pub. No.: WO2021/256780
PCT Pub. Date: Dec. 23, 2021

(65) Prior Publication Data

US 2023/0035524 A1 Feb. 2, 2023

(30) Foreign Application Priority Data

Jun. 19, 2020 (KR) ........................ 10-2020-0074977

(51) Int. Cl.
*H01M 10/42* (2006.01)
*H01M 10/06* (2006.01)
(Continued)

(52) U.S. Cl.
CPC ......... *H01M 10/425* (2013.01); *H01M 10/06* (2013.01); *H01M 10/446* (2013.01); *H01M 50/569* (2021.01); *H01M 2010/4271* (2013.01)

(58) Field of Classification Search
CPC .. H01M 10/425; H01M 10/06; H01M 10/446; H01M 50/569; H01M 2010/4271;
(Continued)

(56) References Cited

U.S. PATENT DOCUMENTS 5,804,859 A * 9/1998 Takahashi ............ H03K 17/127 257/357
9,350,187 B2 * 5/2016 Shreevani ............... B60L 50/16
(Continued)

FOREIGN PATENT DOCUMENTS

CN 101529723 B 7/2011
CN 107554332 A 1/2018
(Continued)

OTHER PUBLICATIONS

J. Qiang, L. Yang, G. Ao and H. Zhong, "Battery Management System for Electric Vehicle Application," 2006 IEEE International Conference on Vehicular Electronics and Safety, Shanghai, China, 2006, pp. 134-138 (Year: 2006).*
(Continued)

*Primary Examiner* — M Baye Diao
(74) *Attorney, Agent, or Firm* — Birch, Stewart, Kolasch & Birch, LLP

(57) ABSTRACT

Discussed is a battery system including a battery; a first main relay connected between one electrode and a first output terminal of the battery; a pre-charge relay connected to the first main relay in parallel; a second main relay connected between another electrode and a second output terminal of the battery; and a battery management system controlling charging and discharging of the battery, and controlling the first main relay, the pre-charge relay, and the second main relay, wherein the battery management system opens the first main relay, the pre-charge relay, and the second main relay when a received power voltage is a predetermined reference
(Continued)

voltage or less, closes the pre-charge relay and the second main relay to execute a pre-charge when the power voltage is higher than the reference voltage, and closes the first main relay after the pre-charge is completed.

12 Claims, 2 Drawing Sheets

(51) Int. Cl.
*H01M 10/44* (2006.01)
*H01M 50/569* (2021.01)

(58) Field of Classification Search
CPC ......... H01M 10/44; H01M 16/00; B60L 3/04; B60L 58/14; B60L 2240/545; B60L 2240/547; B60L 2240/549; B60L 2240/662; B60L 2270/20; B60L 58/20; B60L 58/19; B60L 58/12; H02J 7/00304; H02J 7/0031; H02J 2207/10; Y02E 60/10; Y02T 10/70
USPC .......................................................... 320/152
See application file for complete search history.

(56) References Cited

U.S. PATENT DOCUMENTS 10,879,569 B2 * 12/2020 Yeom .................. H01M 10/425
2005/0093514 A1 * 5/2005 Shimizu .................... H02J 7/56 320/116
2012/0169117 A1 * 7/2012 Park ........................ H02J 7/663 320/136
2014/0225691 A1 * 8/2014 Tanaka ................... H01H 50/20 335/267
2015/0219720 A1 * 8/2015 Huh ...................... H01M 10/46 324/418
2016/0042900 A1 2/2016 Ozaki et al.
2016/0247650 A1 8/2016 Tanaka et al.
2017/0373512 A1 12/2017 Wang
2018/0086220 A1 3/2018 Yang et al.
2018/0123363 A1 5/2018 Kim
2018/0299500 A1 10/2018 Lee
2019/0084424 A1 * 3/2019 Wand ...................... B60L 50/51
2019/0097438 A1 3/2019 Song et al.

FOREIGN PATENT DOCUMENTS

JP 4-344129 A 11/1992
JP H09129208 A * 5/1997 ........ H01M 50/3425
JP 2009-284666 A 12/2009
JP 2013-248971 A 12/2013
JP 2016152206 A * 8/2016 ............. H02H 9/001
JP 6007875 B2 10/2016
JP 6183229 B2 8/2017
JP 2018-138400 A 9/2018
JP 2019-36507 A 3/2019
KR 10-1750073 B1 7/2017
KR 20170099287 A * 8/2017 ........... H01H 47/002
KR 10-2018-0034724 A 4/2018
KR 10-2018-0048068 A 5/2018
KR 10-2018-0115530 A 10/2018
KR 10-2019-0128281 A 11/2019
KR 10-2044737 B1 11/2019
KR 10-2056876 B1 12/2019
WO WO 2009/070940 A1 6/2009
WO WO 2018/093217 A1 5/2018

OTHER PUBLICATIONS

Extended European Search Report for European Application No. 21826516.3, dated May 30, 2023.
International Search Report for PCT/KR2021/007310 mailed on Oct. 7, 2021.

* cited by examiner 1
2
Lead-acid battery
Electric load
3
P+
P-
80
4
VR
101
CM
RS
100
102
S
R
Q
QS
70
Current sensor
VS
60
30
31
32
VG1
33
51
52
VG3
53
50
BMS
20
40
VG2
42
43
41
90
11
12
13
14
15
10

MELT BONDING PREVENTION METHOD AND BATTERY SYSTEM APPLIED WITH THE SAME

CROSS-REFERENCE TO RELATED APPLICATION

This application claims priority to and the benefit of Korean Patent Application No. 10-2020-0074977 filed in the Korean Intellectual Property Office on Jun. 19, 2020, the entire contents of which are incorporated herein by reference.

TECHNICAL FIELD

The present disclosure relates to a melt bonding prevention method and a battery system to which the same is applied.

BACKGROUND ART

When starting at a low temperature, a voltage of a lead-acid battery momentarily drops significantly more than a normal situation. In this case, the voltage supplied to a battery management system (BMS) board is at a voltage level at which the BMS board can operate, but the voltage supplied to a relay may not reach the voltage level at which the relay can operate. Then, a phenomenon in which the relay opens may occur. Since the BMS board can operate, the BMS board attempts to close the relay. In this condition, when the low temperature starting is completed and the voltage of the lead-acid battery returns to a normal, the main relay is closed without pre-charging and the main relay can be melt-bonded.

DISCLOSURE

Technical Problem

A method for preventing melt bonding of the relay and a battery system to which the method is applied are provided.

Technical Solution

A battery system according to the present invention includes: a battery including a plurality of battery cells; a first main relay connected between one electrode and a first output terminal of the battery; a pre-charge relay connected to the first main relay in parallel; a second main relay connected between another electrode and a second output terminal of the battery; and a battery management system controlling charging and discharging of the battery, and controlling the first main relay, the pre-charge relay, and the second main relay, wherein the first main relay, the pre-charge relay, the second main relay, and the battery management system receive a power voltage from an external lead-acid battery, and wherein the battery management system opens the first main relay, the pre-charge relay, and the second main relay when the power voltage is a predetermined reference voltage or less, closes the pre-charge relay and the second main relay to execute a pre-charge when the power voltage is higher than the reference voltage, and closes the first main relay after the pre-charge is completed.

The battery management system may open the first main relay, the pre-charge relay, and the second main relay when the power voltage is the reference voltage or less, and then supply a control voltage closing the pre-charge relay and the second main relay, and when the power voltage is higher than the reference voltage, the pre-charge relay and the second main relay are closed.

The battery management system may open the pre-charge relay after closing the first main relay after the pre-charge is completed.

The battery system may further include: a comparator for detecting whether the power voltage is below the reference voltage; and an SR latch including a set terminal to which a comparison signal of an output of the comparator is input, a reset terminal to which a reset signal is input, and an output terminal outputting a detection signal determined according to the comparison signal and the reset signal.

The battery management system may detect that the power voltage is less than or equal to the reference voltage when the detection signal changes to a level corresponding to a logic 1 by the comparison signal.

The battery management system may change the reset signal to a level corresponding to a logic 1 after the pre-charge is completed.

The battery management system may confirm that the detection signal is changed to a level corresponding to a logic 0 by the reset signal of a level corresponding to a logic 1, and then changes the reset signal to a level corresponding to a logic 0.

A melt bonding prevention method applied to a battery system including a battery, a first main relay, a second main relay, a pre-charge relay, and an SR latch for providing a current path for the battery according to the present invention includes: determining whether a power voltage is less than or equal to a predetermined reference voltage by using a detection signal that is an output of the SR latch; opening the first and second main relays and the pre-charge relay when the power voltage is less than or equal to the reference voltage according to a determination result of the determining; closing the pre-charge relay and the second main relay to perform a pre-charge when the power voltage is higher than the reference voltage after the opening; closing the first main relay after the pre-charge is completed; and opening the pre-charge relay after closing the first main relay, wherein the power voltage is a voltage supplied to the first and second main relays and the pre-charge relay, and the pre-charge relay is connected to the first main relay in parallel.

The melt bonding prevention method of the battery system may further include supplying a reset signal of a level corresponding to a logic 1 to the reset terminal of the SR latch to reset the detection signal after opening the pre-charge relay.

The melt bonding prevention method of the battery system may further include: determining whether the detection signal is reset; and changing the reset signal for resetting the detection signal to a level corresponding to a logic 0.

The reference voltage may be set as a level for detecting that the power voltage is at a level that can drive the battery management system, and is at a level that is low enough to operate the first main relay, the second main relay, and the pre-charge relay.

Advantageous Effects

The method capable of preventing the melt bonding of the relay and the battery system to which the same is applied are provided.

MODE FOR INVENTION

Figure 1:
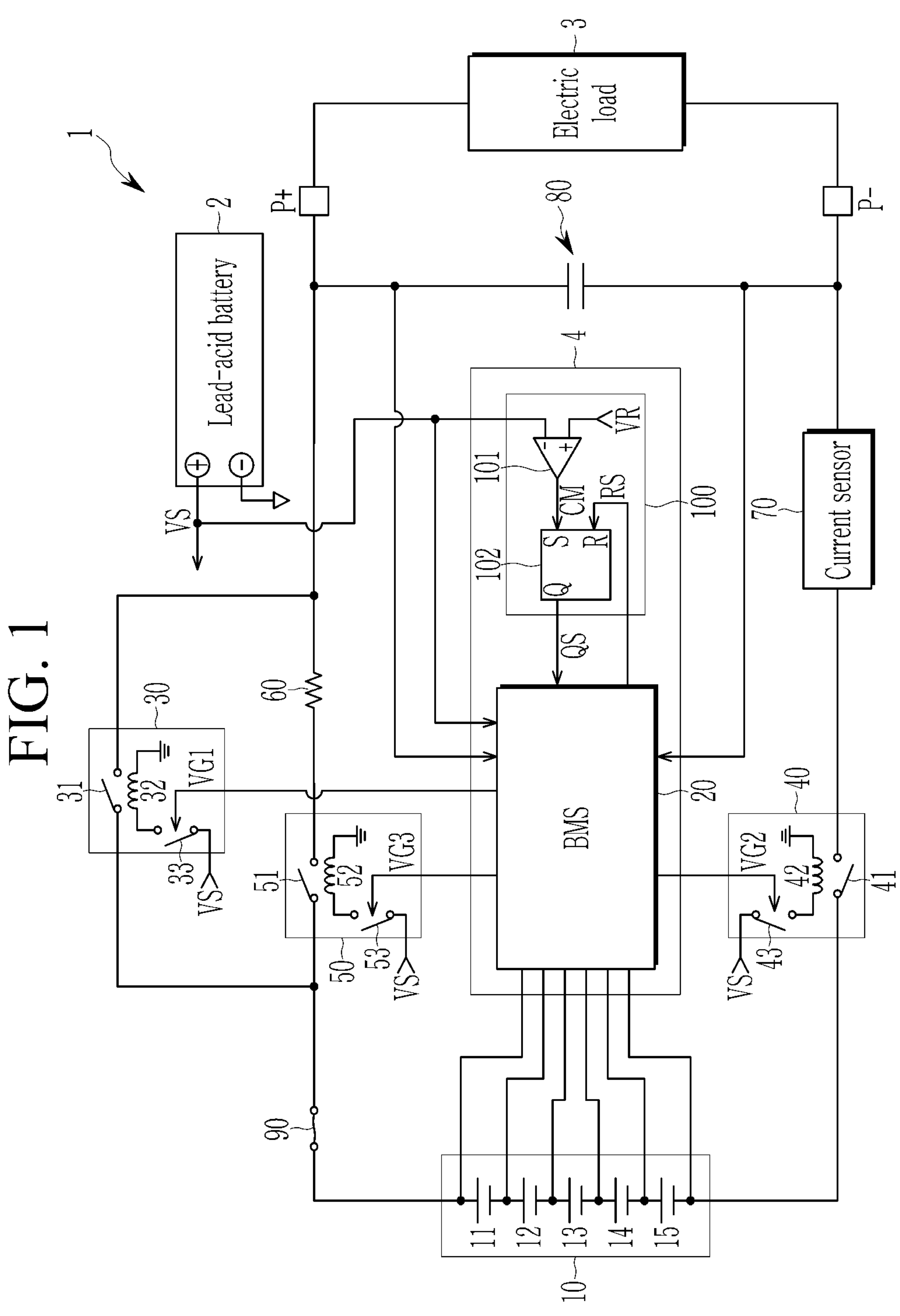
FIG. 1 is a view showing a battery system according to an embodiment.

Hereinafter, embodiments disclosed in the present specification will be described in detail with reference to the accompanying drawings. In the present specification, the same or similar components will be denoted by the same or similar reference numerals, and an overlapped description thereof will be omitted. The terms "module" and "unit" for components used in the following description are used only in order to easily make a specification. Therefore, these terms do not have meanings or roles that distinguish them from each other in themselves. Further, in describing embodiments of the present specification, when it is determined that a detailed description of the well-known art associated with the present invention may obscure the gist of the present invention, it will be omitted. In addition, the accompanying drawings are provided only in order to allow embodiments disclosed in the present specification to be easily understood and are not to be interpreted as limiting the spirit disclosed in the present specification, and it is to be understood that the present invention includes all modifications, equivalents, and substitutions without departing from the scope and spirit of the present invention.

Terms including ordinal numbers such as first, second, and the like will be used only to describe various components, and are not interpreted as limiting these components. The terms are only used to differentiate one component from other components.

It is to be understood that when one component is referred to as being "connected" or "coupled" to another component, it may be connected or coupled directly to another component or be connected or coupled to another component with the other component intervening therebetween. On the other hand, it is to be understood that when one component is referred to as being "connected or coupled directly" to another component, it may be connected to or coupled to another component without another component intervening therebetween.

It will be further understood that terms "comprise" or "have" used in the present specification specify the presence of stated features, numerals, steps, operations, components, parts, or a combination thereof, but do not preclude the presence or addition of one or more other features, numerals, steps, operations, components, parts, or a combination thereof.

FIG. 1 is a view showing a battery system according to an embodiment.

A battery system 1 of FIG. 1 may be a power supply that is mounted on a vehicle and supplies power to an electric load 3 such as a motor for driving the vehicle. In addition, a charger is connected to output terminals (P+, P−) instead of the electric load 3, and the battery system 1 may be charged by power supplied from the charger.

The battery system 1 may include a battery 10, a battery management system (BMS) 20, a first main relay 30, a second main relay 40, a pre-charge relay 50, a pre-charge resistor 60, a current sensor 70, a link capacitor 80, a fuse 90, and a melt bonding preventing unit 100.

The lead-acid battery 2 supplies the power voltage (or the supply voltage) VS to the board 4, the first main relay 30, the second main relay 40, and the pre-charge relay 50. The lead-acid battery 2 may supply the power voltage VS to the electric load of the vehicle. On the board 4, the BMS 20 and the melt bonding preventing unit 100, etc. may be positioned. Additional components may be further positioned on the board 4 shown in FIG. 1.

As shown in FIG. 1, the battery 10 includes a plurality of battery cells 11-15 connected in series. In FIG. 1, the battery 10 is illustrated as including five battery cells 11-15 as an example, but the invention is not limited thereto.

The fuse 90 is connected to between a positive electrode of the battery 10 and the output terminal (P+) and may be disconnected when a temperature reaches a threshold value due to an excessive current.

The current sensor 70 may sense the current flowing through the battery 10 (hereinafter, a battery current), and the current sensor 70 may transmit a signal indicating the sensed current to the BMS 20.

The BMS 20 is connected to a plurality of battery cells 11-15 to measure a cell voltage of a plurality of battery cells 11-15, receives information of a battery current, a temperature of the battery 10, and the like, controls a charge and discharge current of the battery 10 based on the cell voltage, the battery current, the temperature, and the like of a plurality of battery cells 11-15, and may control a cell balancing operation for a plurality of battery cells 11-15. The power voltage VS required for the operation of the BMS 20 may be supplied from the lead-acid battery 2.

The BMS 20 may control the operation of the first main relay 30, the second main relay 40, and the pre-charge relay 50 based on the detection signal QS input from the melt bonding preventing unit 100. For example, when a detection signal QS indicating that the power voltage VS decreases below a predetermined reference voltage VR is received from the melt bonding preventing unit 100, after all relays 30-50 are opened, the pre-charge relay 50 and the second main relay 40 are closed, allowing the pre-charge operation to proceed for a predetermined period of time. Subsequently, the BMS 20 closes the first main relay 30 and opens the pre-charge relay 50. After that, the BMS 20 may reset the melt bonding preventing unit 100 to reset the detection signal QS.

The first main relay 30, the second main relay 40, and the pre-charge relay 50 form a current path so that the charging current or the discharging current for the battery 10 may flow. The pre-charge relay 50 is connected in parallel to the first main relay 30.

The first main relay 30 includes a switch 31, an inductor 32, and a control switch 33. One terminal of the switch 31 is connected to the positive electrode of battery 10, the other terminal of the switch 31 is connected to the output terminal (P+), and the switch 31 may be closed when the current flows in the inductor 32 and may be opened if the current does not flow through the inductor 32. One terminal of the inductor 32 is connected to a ground, and the other terminal of the inductor 32 is connected to one terminal of the control switch 33. The power voltage VS is supplied to the other terminal of the control switch 33, and the control switch 33 is switched by the control voltage VG1 supplied from the BMS 20. For example, when the control voltage VG1 is at an on level, the control switch 33 is turned on, and when the control voltage VG1 is at an off level, the control switch 33 is turned off.

The second main relay 40 includes a switch 41, an inductor 42, and a control switch 43. One terminal of the switch 41 is connected to the negative electrode of the battery 10, the other terminal of the switch 41 is connected to the output terminal (P−), and the switch 41 may be closed when the current flows to the inductor 42, and be opened when the current does not flow in the inductor 42. One terminal of the inductor 42 is connected to ground, and the other terminal of the inductor 42 is connected to one terminal of the control switch 43. The power voltage VS is supplied to the other terminal of the control switch 43, and the control switch 43 is switched by the control voltage VG2 supplied from the BMS 20. For example, when the control voltage VG2 is at an on level, the control switch 43 is turned on, and when the control voltage VG2 is an off level, the control switch 43 is turned off.

The pre-charge relay 50 is connected in parallel to the first main relay 30 together with the pre-charge resistor 60, and includes a switch 51, an inductor 52, and a control switch 53. One terminal of the switch 51 is connected to the positive electrode of the battery 10, the other terminal of the switch 51 is connected to one terminal of the pre-charge resistor 60, and the switch 51 may be closed when the current flows in the inductor 52 and may be opened if the current does not flow in the inductor 52. One terminal of the inductor 52 is connected to the ground, and the other terminal of the inductor 52 is connected to one terminal of the control switch 53. The power voltage VS is supplied to the other terminal of the control switch 53, and the control switch 53 is switched by the control voltage VG3 supplied from the BMS 20. For example, when the control voltage VG3 is at an on level, the control switch 53 is turned on, and when the control voltage VG3 is at an off level, the control switch 53 is turned off.

The other terminal of the pre-charge resistor 60 is connected to the output terminal (P+). The link capacitor 80 is connected between the output terminal (P+) and the output terminal (P−), thereby filtering a noise component of the output voltage suppled from the battery 10 to the electric load 3, or reducing a quick change of the output voltage.

The melt bonding preventing unit 100 includes a comparator 101 and an SR latch 102.

The comparator 101 may output a comparison signal CM of a high level indicating a logic "1" if the voltage of the input terminal (+) is higher than the voltage of the input terminal (−), and output a comparison signal CM of a low level indicating a logic "0" if the voltage of the input terminal (+) is lower than the voltage of the input terminal (−). The power voltage VS may be input to the input terminal (−) of the comparator 101 and the reference voltage VR may be input to the input terminal (+) of the comparator 101. The power voltage VS is at a level that may drive the BMS 20, but the reference voltage VR may be set as a level to detect that it is low enough to operate the first main relay 30, the second main relay 40, and the pre-charge relay 50. For example, the power voltage of the vehicle equipped with the battery system 1 is 13 V at the normal starting, and at low temperature starting, the power voltage VS coming into the board 4 may drop to 5.5 V for several tens of milliseconds (ms) and then rise to 13 V. At this time, 5.5 V is a voltage level that can operate the BMS 20, but it is insufficient as an operating voltage of the first main relay 30, the second main relay 40, and the pre-charge relay 50. Accordingly, the reference voltage VR may be set to 5.5 V.

The SR latch 102 determines the detection signal QS of the output terminal Q based on the signal input to the set terminal S and resets the detection signal QS of the output terminal Q based on the signal input to the reset terminal R. For example, when the input signal of the set terminal S is at a high level corresponding to a logic "1", the detection signal QS becomes a high level, when the input signal of the reset terminal R is at a high level corresponding to a logic "1", the detection signal QS becomes a low level. When the input of the set terminal S and the reset terminal R is at a low level corresponding to a logic "0", the detection signal QS is maintained. If the comparison signal CM of the output of the comparator 101 is at a high level, the SR latch 102 generates the detection signal QS of a high level, and if the input of the reset terminal R is at the high level, the detection signal QS may be set as a low level.

Hereinafter, a melt bonding prevention method according to an embodiment is described with reference to FIG. 2.

Figure 2:
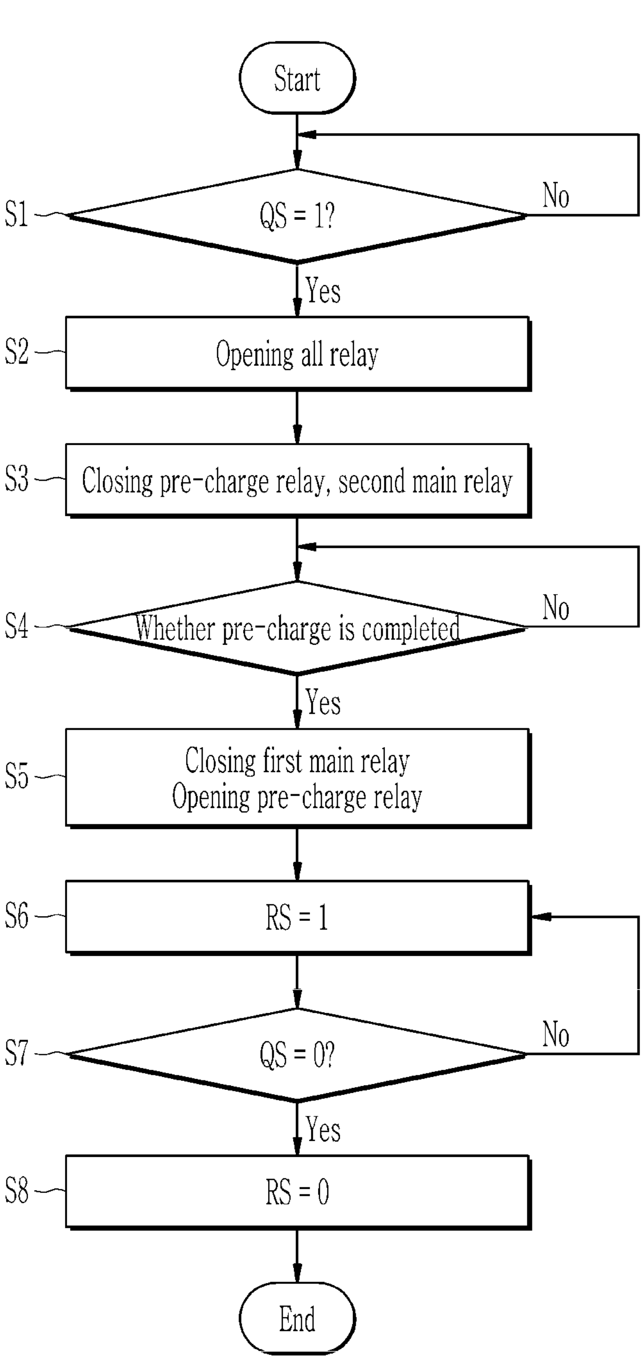
FIG. 2 is a flowchart showing a melt bonding prevention method according to an embodiment.

FIG. 2 is a flowchart showing a melt bonding prevention method according to an embodiment.

First, the BMS 20 determines whether the detection signal QS is at a high level indicating a logic "1" (51). When the detection signal QS is at a low level indicating a logic "0" rather than "1", the step (51) is continuously repeated. That the detection signal QS indicates a logic 1 means that the power voltage VS is less than or equal to the reference voltage VR.

When the detection signal QS is "1" as the determination result of the step (51), the BMS 20 opens all relays (S2). That is, all of the first main relay 30, the second main relay 40, and the pre-charge relay 50 are opened regardless of the previous state.

Next, the BMS 20 outputs the control voltage VG2 and the control voltage VG3 of an on level for closing the pre-charge relay 50 and the second main relay 40 to the pre-charge relay 50 and the second main relay 40. If the power voltage VS is in the normal state of more than the reference voltage VR, the pre-charge relay 50 and the second main relay 40 are closed according to the control voltages VG2 and VG3 of the on level (S3). Then, the pre-charge is performed by the current flowing through the battery 10, the pre-charge relay 50, the pre-charge resistor 60, and the second main relay 40. The link capacitor 80 is charged by the pre-charge current.

If the power voltage VS is less than the reference voltage VR, the pre-charge relay 50 and the second main relay 40 are not closed because the power voltage VS is low despite the control voltages VG2 and VG3 of the on level. After that, when the power voltage VS exceeds the reference voltage VR, the pre-charge relay 50 and the second main relay 40 are closed.

When the link voltage, which is the voltage across both terminals of the link capacitor 80, reaches a predetermined ratio compared to the voltage across both terminals of the battery 10 by the pre-charge, it may be determined that the pre-charge is completed. The BMS 20 detects the link voltage to determine whether the pre-charge is completed (S4). The predetermined ratio may be set within the range of 95-97%. As a result of the determination of the step S4, if the link voltage does not reach a predetermined ratio compared to the voltage across both terminals of the battery 10, the pre-charge continues and the step (S4) is continuously repeated.

As a result of the step (S4), if the pre-charge is completed, the BMS 20 closes the first main relay 30 and opens the pre-charge relay 50 (S5). There may be a predetermined time delay between the closing timing of the first main relay 30 and the opening timing of the pre-charge relay 50.

Subsequently, the BMS 20 generates the reset signal RS with a high level corresponding to a logic "1" (S6). Then, a high level is input to the reset terminal R of the SR latch 102, and the detection signal QS may be changed to a low level corresponding to a logic "0". That is, the detection signal QS is reset to the initial state.

The BMS 20 determines whether the detection signal QS is "0" (S7). If the detection signal QS is not 0 as the determination result of the step (S7), the BMS 20 maintains the reset signal RS as 1.

As the determination result of the step S7, if the detection signal QS is 0, the BMS 20 generates a reset signal RS with a low level corresponding to a logic "0" (S8).

A conventional art uses capacitors to prevent an instantaneous voltage drop of the lead-acid batteries. However, the conventional art does not consider the case where the voltage drop of the lead-acid battery occurs for tens of milliseconds. In order to prevent the voltage drop of several tens of milliseconds, a plurality of capacitors are required, which may increase the board size. In addition, the method of stopping the relay operation by detecting the voltage drop of the lead-acid battery with conventional software has a problem in the operation speed. In other words, the voltage drop may not be detected due to the time problem required to execute the software.

An embodiment of the present invention may detect the voltage drop of the lead-acid battery by using the hardware. The battery system according to an embodiment of the present invention may detect the occurrence of the voltage drop of the lead-acid battery by using the comparator that compares the voltage of the lead-acid battery and the SR latch that operates according to the output of the comparator. Since the voltage drop is detected by the hardware, it is possible to detect the instantaneous voltage drop that may be missed depending on the software operation speed and to prevent the melt bonding of the relay.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

The invention claimed is:

1. A battery system comprising:

a battery including a plurality of battery cells;

a first main relay connected between one electrode and a first output terminal of the battery;

a pre-charge relay connected to the first main relay in parallel;

a second main relay connected between another electrode and a second output terminal of the battery; and a battery management system controlling charging and discharging of the battery, and controlling the first main relay, the pre-charge relay, and the second main relay, wherein the first main relay, the pre-charge relay, the second main relay, and the battery management system receive a supply voltage from an external lead-acid battery, and wherein the battery management system opens the first main relay, the pre-charge relay, and the second main relay when the supply voltage is a predetermined reference voltage or less, closes the pre-charge relay and the second main relay to execute a pre-charge when the supply voltage is higher than the predetermined reference voltage, and closes the first main relay after the pre-charge is completed.

2. The battery system of claim 1, wherein:

the battery management system opens the first main relay, the pre-charge relay, and the second main relay when the supply voltage is the predetermined reference voltage or less, and then supplies a control voltage closing the pre-charge relay and the second main relay, and when the supply voltage is higher than the predetermined reference voltage, the pre-charge relay and the second main relay are closed.

3. The battery system of claim 1, wherein the battery management system opens the pre-charge relay after closing the first main relay after the pre-charge is completed.

4. The battery system of claim 1, further comprising:

a comparator for detecting whether the supply voltage is below the predetermined reference voltage; and an SR latch including a set terminal to which a comparison signal of an output of the comparator is input, a reset terminal to which a reset signal is input, and an output terminal outputting a detection signal determined according to the comparison signal and the reset signal.

5. The battery system of claim 4, wherein the battery management system detects that the supply voltage is less than or equal to the predetermined reference voltage when the detection signal changes to a level corresponding to a logic 1 by the comparison signal.

6. The battery system of claim 5, wherein the battery management system changes the reset signal to a level corresponding to a logic 1 after the pre-charge is completed.

7. The battery system of claim 6, wherein the battery management system confirms that the detection signal is changed to a level corresponding to a logic 0 by the reset signal of a level corresponding to a logic 1, and then changes the reset signal to a level corresponding to a logic 0.

8. The battery system of claim 1, wherein the predetermined reference voltage is set as a level for detecting that the supply voltage is at a level that can drive the battery management system, and is at a level that is low enough to operate the first main relay, the second main relay, and the pre-charge relay.

9. A melt bonding prevention method applied to a battery system including a battery, a first main relay, a second main relay, a pre-charge relay, and an SR latch for providing a current path for the battery, the method comprising:

determining whether a supply voltage is less than or equal to a predetermined reference voltage by using a detection signal that is an output of the SR latch;

opening the first and second main relays and the pre-charge relay when the supply voltage is less than or equal to the predetermined reference voltage according to a determination result of the determining;

closing the pre-charge relay and the second main relay to perform a pre-charge when the supply voltage is higher than the predetermined reference voltage after the opening;

closing the first main relay after the pre-charge is completed; and opening the pre-charge relay after closing the first main relay, wherein the supply voltage is a voltage supplied to the first and second main relays and the pre-charge relay, and the pre-charge relay is connected to the first main relay in parallel.

10. The melt bonding prevention method of claim 9, further comprising supplying a reset signal of a level corresponding to a logic 1 to a reset terminal of the SR latch to reset the detection signal after opening the pre-charge relay.

11. The melt bonding prevention method of claim 10, further comprising:

determining whether the detection signal is reset; and changing the reset signal for resetting the detection signal to a level corresponding to a logic 0.

12. The melt bonding prevention method of claim 9, wherein the predetermined reference voltage is set as a level for detecting that the supply voltage is at a level that can drive the battery management system, and is a level that is low enough to operate the first main relay, the second main relay, and the pre-charge relay.

* * * * *